No. 893,744.

PATENTED JULY 21, 1908.

J. C. MOORE.
HAND TRUCK.
APPLICATION FILED AUG. 27, 1907.

WITNESSES:
Wilhelm Vogt
Thomas M. Smith

INVENTOR
James C. Moore,
BY
J. Walter Douglas
ATTORNEY.

UNITED STATES PATENT OFFICE.

JAMES C. MOORE, OF PHILADELPHIA, PENNSYLVANIA.

HAND-TRUCK.

No. 893,744. Specification of Letters Patent. Patented July 21, 1908.

Application filed August 27, 1907. Serial No. 390,296.

*To all whom it may concern:*

Be it known that I, JAMES C. MOORE, a citizen of the United States, residing at the city of Philadelphia, in the county of Philadelphia and State of Pennsylvania, have invented certain new and useful Improvements in Hand-Trucks, of which the following is a specification.

My invention has relation to a portable hand truck for impelling barrels, boxes or other similar articles from place to place and the truck so arranged as to be convertible for like purposes in which articles thereon can be drawn from place to place by bringing into position roller means at end portions of the truck; and in such connection my present invention relates to the constructive arrangement of the truck with the defined interchangeable features for adapting the same for hand trucking by an impelling action as well as for conveying articles thereon by a drawing action.

Figure 1:
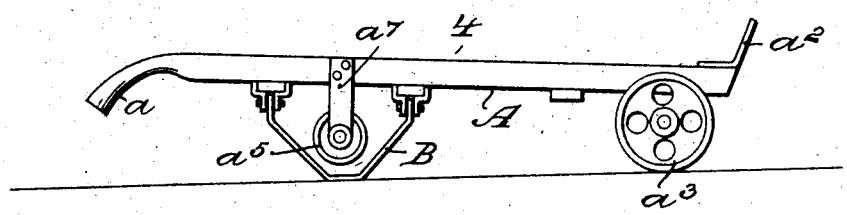
Figure 2:
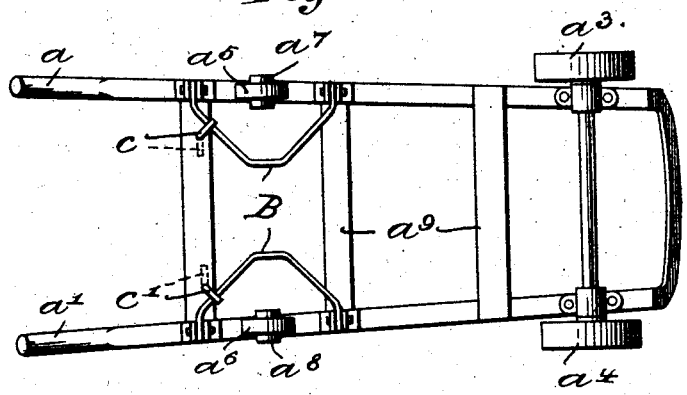

The nature and scope of my present invention will be more fully understood from the following description taken in connection with the accompanying drawings forming part hereof, in which Figure 1 is a side elevational view of a truck embodying the interchangeable features of my present invention for adapting the same for hand trucking of a load by an impelling action or of the conveying of a load by a drawing action. Fig. 2 is a bottom plan view of the truck, showing the conveying means in operative position, and with the rests or supports shown in an inoperative position when the truck is used in such relation, as above defined; and Fig. 3 is a perspective view, enlarged, embodying the particular features of my present invention, as illustrated in Fig. 1, showing the detail arrangement of the same and the manner of shifting the rear supports or rests of the truck into an inoperative position, as may be required by throwing into action the rear rollers to cause the truck to assume a position as a conveying means, for boxes, barrels or other articles, from place to place.

Figure 3:
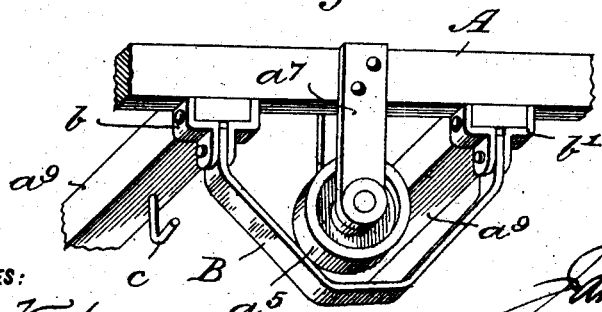

Referring to the drawings 4, represents a portable truck consisting of the frame-work A, having the handles $a$ and $a^1$, in the rear thereof, and provided in front with an inclined support $a^2$, upon which the article supported upon the truck-frame in an inclined position thereof, rests in carriage, $a^3$ and $a^4$, are the front road wheels and $a^5$ and $a^6$, the rear rollers journaled to the frame-work A, by means of projecting bearing-straps $a^7$ and $a^8$, as clearly shown in Fig. 3. The truck-framework A, is provided with a series of cross-bars $a^9$, to certain of which, near the ends thereof, are secured substantially Y-shaped brackets $b$ and $b^1$, to which is hinged a substantially V-shaped support or rest B. These supports or rests are adapted to be shifted inward so as to engage the movable hooks $c$ and $c^1$, secured to and projecting from one of the cross-bars $a^9$, of the truck-frame, so that when the rests or supports B, assume an inoperative position as shown in Fig. 2, they will be held in such position in engagement with the movable hooks $c$ and $c^1$. The hand truck thus arranged in order to be adapted for use of the supports B, the rollers $a^5$ and $a^6$, will occupy an inoperative position within the rests or supports B, as shown in Figs. 1 and 3, to permit by means of the handles $a$ and $a^1$, the truck A being impelled with a load supported thereon and resting against the inclined front support $a^2$ thereof, while when the truck is to be used as a means for supporting a load to be conveyed from place to place, the supports or rests B, will be caused to assume a position immediately beneath the truck-frame, that is, a position such as is illustrated in Fig. 2, with the respective rollers $a^5$ and $a^6$, and wheels $a^3$ and $a^4$, of the truck in an operative position, with the truck assuming in such position a substantially horizontal plane having the load thereon to be drawn from one place to another.

Having thus described the nature and objects of my present invention, what I claim as new and desire to secure by Letters Patent is:—

1. In a hand truck, front wheels, rear rollers and supports or rests spanning said rollers to permit the same to assume respectively, operative and inoperative positions, substantially as and for the purposes set forth.

2. In a hand-truck, a frame provided with front wheels and rear rollers and movable supports or rests spanning said rollers and adapted to be shifted so that said rollers assume an inoperative position, substantially as and for the purposes set forth.

3. A hand-truck provided with impelling wheels and rollers, movable supports or rests spanning said rollers and means for holding said supports or rests in an inoperative position, substantially as and for the purposes set forth.

In witness whereof, I have hereunto set my signature in the presence of two subscribing witnesses.

JAMES C. MOORE.

Witnesses:
 WILHELM VOGT,
 THOMAS M. SMITH.